United States Patent
Ito

(10) Patent No.: US 7,584,333 B2
(45) Date of Patent: Sep. 1, 2009

(54) DATA PROCESSING DEVICE IN VEHICLE CONTROL SYSTEM

(75) Inventor: Ryo Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 359 days.

(21) Appl. No.: 11/052,784

(22) Filed: Feb. 9, 2005

(65) Prior Publication Data

US 2005/0198002 A1 Sep. 8, 2005

(30) Foreign Application Priority Data

Mar. 4, 2004 (JP) ............................. 2004-061030

(51) Int. Cl.
- *G06F 13/00* (2006.01)
- *G06F 13/28* (2006.01)
- *G06F 7/00* (2006.01)
- *B60R 22/00* (2006.01)
- *E05F 15/00* (2006.01)
- *G05D 3/00* (2006.01)

(52) U.S. Cl. .................. 711/154; 711/170; 711/171; 711/172; 711/173; 701/36; 701/48

(58) Field of Classification Search ............... 711/154, 711/170–173; 701/36, 48
See application file for complete search history.

(56) References Cited

U.S. PATENT DOCUMENTS

| 5,018,060 | A | * | 5/1991 | Gelb et al. | ............... | 707/205 |
| 5,276,619 | A | * | 1/1994 | Ohara et al. | ............... | 701/35 |
| 5,606,726 | A | * | 2/1997 | Yoshinobu | ............... | 725/114 |
| 5,890,014 | A | * | 3/1999 | Long | ............... | 710/8 |
| 6,826,665 | B1 | * | 11/2004 | Nambu | ............... | 711/162 |
| 2002/0138694 | A1 | | 9/2002 | Isshiki | | |
| 2003/0225801 | A1 | * | 12/2003 | Devarakonda et al. | ...... | 707/205 |
| 2004/0024796 | A1 | * | 2/2004 | Takeda et al. | ............... | 707/205 |
| 2004/0236488 | A1 | | 11/2004 | Predelli | | |
| 2004/0243699 | A1 | * | 12/2004 | Koclanes et al. | ............. | 709/224 |

FOREIGN PATENT DOCUMENTS

| DE | 100 09 770 A1 | 9/2001 |
| DE | 101 62 853 C1 | 6/2003 |
| JP | A-1-276346 | 11/1989 |
| JP | A-3-290711 | 12/1991 |
| JP | A-4-299747 | 10/1992 |
| JP | A-9-6542 | 1/1997 |
| JP | A-9-134257 | 5/1997 |
| JP | 11-099891 | 4/1999 |
| JP | 2000-251396 | 9/2000 |
| JP | 2001-075873 | 3/2001 |
| JP | A-2001-307410 | 11/2001 |
| JP | A-2002-41362 | 2/2002 |
| JP | A-2002-169740 | 6/2002 |
| WO | WO 02/54221 A2 | 7/2002 |

* cited by examiner

*Primary Examiner*—Sanjiv Shah
*Assistant Examiner*—Yaima Campos
(74) *Attorney, Agent, or Firm*—Oliff & Berridge, PLC

(57) ABSTRACT

A data storage device executes a program including the steps of: determining whether or not a storage instruction to include data to be stored, along with a class generated as a label common among application software, has been obtained; detecting a class in the contents of the storage instruction when the storage instruction is obtained; determining a storage manner based on the class and a table defining in advance storage manners; and storing data in an appropriate storage medium with appropriate data redundancy based on the determined storage manner.

12 Claims, 7 Drawing Sheets

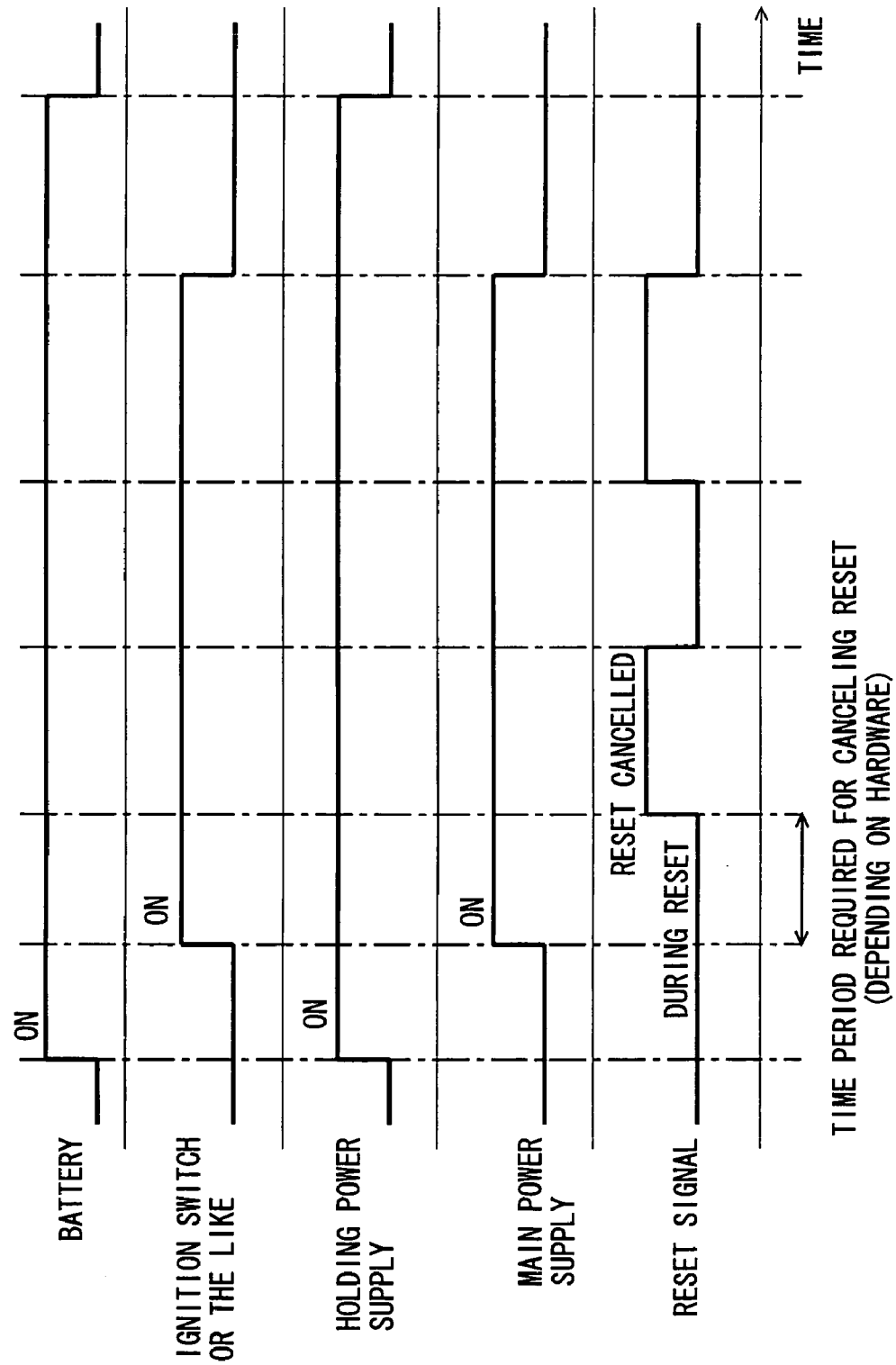

F I G. 5

| HOLDING TIME PERIOD / DATA RELIABILITY | | A. STORE WHILE RESET IS CANCELLED [MOUNT EXAMPLE] NON-HOLDING RAM (NON-HOLDING DURING RESET) | B. STORE WHILE MAIN POWER SUPPLY IS TURNED ON [MOUNT EXAMPLE] NON-HOLDING RAM (HOLDING DURING RESET) | C. STORE WHILE HOLDING POWER SUPPLY IS TURNED ON [MOUNT EXAMPLE] HOLDING RAM | D. STORE CONSTANTLY [MOUNT EXAMPLE] EMBEDDED E2PROM, E2PROM, HDD, etc. |
|---|---|---|---|---|---|
| 1. DESTRUCTION NOT DETECTED EVEN WHEN DATA IS DESTRUCTED | [MOUNT EXAMPLE] NO DATA MULTIPLEXING | CLASS (1-A) | CLASS (1-B) | CLASS (1-C) | CLASS (1-D) |
| 2. DESTRUCTION DETECTED WHEN DATA IS DESTRUCTED | [MOUNT EXAMPLE] SIMPLE DATA DUPLEX, SUCH AS CHECK SUM, PARITY BIT, ERROR DETECTION CODE, etc. | CLASS (2-A) | CLASS (2-B) | CLASS (2-C) | CLASS (2-D) |
| 3. DESTRUCTION DETECTED AND DATA REPAIRED WHEN DATA IS DESTRUCTED (SINGLE FAILURE) | [MOUNT EXAMPLE] DATA TRIPLEX, DATA QUADRUPLEX, ERROR CORRECTION CODE, etc. | CLASS (3-A) | CLASS (3-B) | CLASS (3-C) | CLASS (3-D) |
| 4. DESTRUCTION DETECTED AND DATA REPAIRED WHEN DATA IS DESTRUCTED (DOUBLE FAILURE) | [MOUNT EXAMPLE] DATA QUINTUPLE OR MORE, ERROR CORRECTION CODE, etc. | CLASS (4-A) | CLASS (4-B) | CLASS (4-C) | CLASS (4-D) |

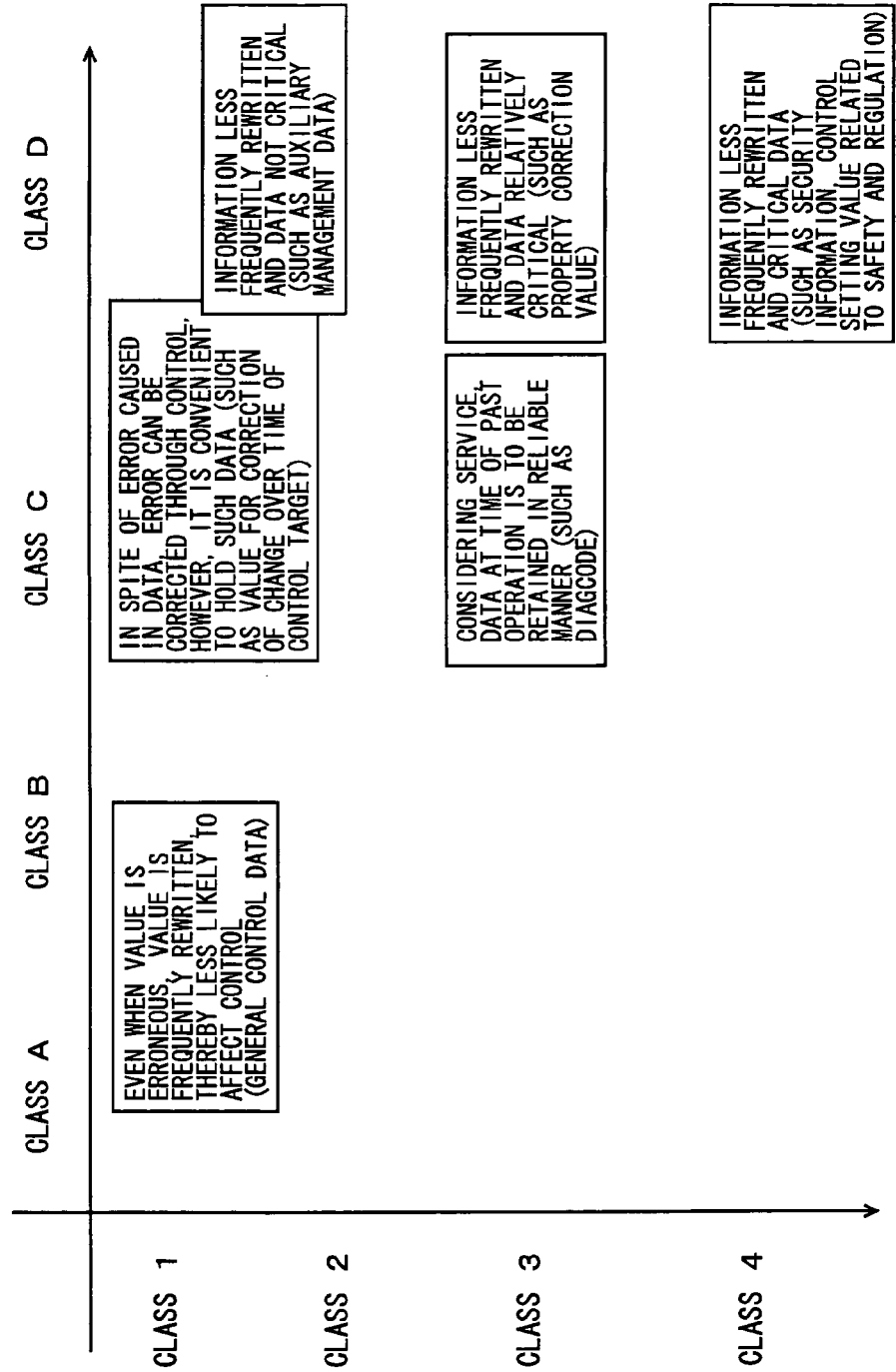

DATA PROCESSING DEVICE IN VEHICLE CONTROL SYSTEM

This nonprovisional application is based on Japanese Patent Application No. 2004-061030 filed with the Japan Patent Office on Mar. 4, 2004, the entire contents of which are hereby incorporated by reference.

FIELD OF THE INVENTION

The present invention relates to a vehicle control system incorporated in a vehicle, and more particularly to a device executing a processing to appropriately store data in accordance with reliability requested to the data or a time period to store the same (holding period) in view of significance of the data, while suppressing cost for a storage medium.

DESCRIPTION OF THE BACKGROUND ART

A high-performance microprocessor has recently been developed, and a computer unit (ECU (Electronic Control Unit)) including a large number of microprocessors is incorporated in a vehicle such as an automobile. The ECU seeks driving performance, safety, comfort, resource-saving, energy-saving, and the like, and the ECU is incorporated in order to control a power train system, a body system, a safety system, an information system, and the like of the vehicle.

For example, each ECU controls: a vehicle motion system including an engine, a brake, a steering wheel, a suspension, and a transmission (the ECU may control a part of or all of these parts in an integrated manner); the body system including a power door, a power seat, an air conditioner, and a light; the safety system including an air bag and a collision sensor; and the information system including a car navigation device and a car audio apparatus.

On the other hand, in these ECUs, a program stored in advance is executed by a CPU (Central Processing Unit) within the ECU. A storage device stores the program itself, an operation result during execution of the program, an operation result after execution of the program, a map referred to in program execution, or the like (collectively denoted as "data"). Storage media such as a hard disk, a variety of ROMs (Read Only Memory), a variety of RAMs (Random Access Memory), or the like are used as the storage device. The hard disk, the ROM, and the RAM have a variety of characteristics respectively.

Japanese Patent Laying-Open No. 2000-251396 (document 1) discloses an on-vehicle information processing device including a writable hard disk and reliably carrying out writing in the hard disk. The on-vehicle information processing device with the hard disk includes a semiconductor memory capable of recording information to be written in the hard disk, a failure sensing unit sensing a state that may cause failure in a operation to write in the hard disk, and a control unit writing information to be written in the hard disk into the semiconductor memory when the state that may cause failure is sensed by the failure sensing unit and writing the information written in the semiconductor memory into the hard disk when the state that may cause failure is no longer sensed.

According to the on-vehicle information processing device, the failure sensing unit monitors a state of the hard disk. When a state that may cause failure in data writing is present, information to be written is once stored in the semiconductor memory. When such a state is no longer present, data writing to the hard disk is reliably carried out.

Japanese Patent Laying-Open No. 2001-075873 (document 2) discloses a method of data back-up attaining high cost-effectiveness. The data back-up method of saving data in a multi-platform environment includes the steps of: managing a significance level of each data as well as a reliability level or a speed of a back-up storage device; and saving each data in an optimal back-up storage device.

According to the data back-up method, the significance level of the data in the multi-platform environment as well as the reliability level or the speed of the back-up storage device are managed so as to optimize a back-up target. As a result, back-up attaining high cost-effectiveness can be carried out.

The ECU, the hard disk and the like incorporated in a vehicle are supplied with electric power from a battery incorporated in the vehicle. A semiconductor memory such as an ROM or an RAM is implemented within the ECU. The storage medium such as the hard disk or the semiconductor memory has such a characteristic as inability to hold data when power supply is turned off as in a semiconductor memory called a volatile memory, or a characteristic as ability to hold data even when the power supply is turned off as in a semiconductor memory called a non-volatile memory or a hard disk. Power supply to these storage media is controlled based on a state of an ignition switch of a vehicle, a state of a system main relay (SMR), or the like. In addition, reliability in data storage (whether or not a state in which data is correctly stored can be held) is different between the semiconductor memory and the hard disk, for example.

Meanwhile, the data stored in such a storage medium has different significance depending on a type thereof. For example, data for realizing control determined by a regulation concerning the vehicle, data on security, or data related to safety has highest significance. On the other hand, for example, a learning control parameter while learning control is exerted for optimal control of an engine or a transmission is overwritten every sampling time. Accordingly, significance of the learning control parameter is lower than that of the data described above. In this manner, the data to be stored has different significance for each type.

As described above, a plurality of types of storage media having a variety of storage characteristics are incorporated in a vehicle, whereas the data to be stored has different significance. Therefore, in view of the significance of the data in particular, preferably, the storage media are used, with definite distinction being drawn among them with respect to data reliability and a data holding period. Though it is possible to store all data only in a storage medium attaining high reliability and having a data holding period independent of a power supply state, this will cause cost increase. In view of the foregoing, problems in the documents set forth above will be discussed.

The on-vehicle information processing device disclosed in document 1 is not paying attention to the data significance. Instead, this device simply stores the data in a non-volatile memory when a state that may cause failure in the operation to write in the hard disk is sensed. If many states that may cause failure in the writing operation are assumed, a non-volatile memory capable of storing all data to be stored in the hard disk should be prepared, which may result in a larger size of the storage device and cost increase.

According to the data back-up method disclosed in document 2, a server system simply has a setting of a significance level with respect to storage at each platform, so that a back-up target is optimized in accordance with the setting. That is, the data of high significance is stored in a highly reliable storage device, while data of low significance is stored in a less reliable storage device. According to the disclosure, a tape library device is adopted as a first storage device having the highest reliability level, a magnetic disk device is adopted as a second storage device having a second highest reliability level, and a magnetic disk device is adopted as a third storage device having a third highest reliability level. With this method, only one storage medium for storing the data can be selected from these storage devices in an alternative manner.

A further problem will be discussed from a point of view different from these documents. Conventionally, a storage medium in which the data is to be stored has been designated in a program. Accordingly, it has been necessary to designate a storage medium to store that data based on significance of the program among a large number of programs to be executed in a vehicle and on significance of the data in the program. When a new and highly reliable storage medium is mounted as a result of modification of a hardware configuration in a vehicle control system or when a method of attaining redundancy is modified, however, a program (application software) should be modified. In that case, since total review of a large number of programs may be necessary, productivity of the application software is considerably lowered.

SUMMARY OF THE INVENTION

The present invention was made to solve the above-described problems. An object of the present invention is to provide a data processing device in a vehicle control system capable of appropriately storing data having different significance while suppressing cost for a storage medium and capable of readily accommodating modification of data significance or modification of reliability of a data storage medium.

A data processing device according to the present invention stores data in an application to be executed in an operation unit in at least one of a plurality of storage media in a vehicle control system including the operation unit and the plurality of storage media. The data processing device includes: an obtaining unit for obtaining information on significance of data processed in the operation unit from the application; and a processing unit selecting a storage medium from the plurality of storage media in accordance with significance of the data and setting a manner of storage in the selected storage medium. The information on the significance is common among a plurality of applications.

According to the present invention, information on significance of the data is obtained from the application, and the manner of storage in a plurality of types of storage media (such as a semiconductor memory or a hard disk) is set based on the significance. That is, as the significance of data is higher, the data is stored with higher redundancy, for example. On the other hand, the data of lower significance is stored without redundancy, for example. Accordingly, larger size of the storage device or increase in the cost for storage can be suppressed. In addition, a limited memory capacity can effectively be utilized so as to enhance reliability of the vehicle control system. In particular, even when a master ECU or a vehicle control system using a large amount of memory capacity for storing ITS (Intelligent Transport Systems) information or image information is implemented, reliability in control and suppression of a larger size of the ECU can both be attained. Moreover, since the information on significance is common regardless of the type of the application, accommodation of modification of data significance as well as modification of reliability of a data storage medium can be facilitated. As a result, a data processing device in a vehicle control system capable of appropriately storing data having different significance and readily accommodating modification of data significance or modification of reliability of the data storage medium can be provided.

Preferably, the data processing device further includes a storage unit storing information for determining the storage medium and the manner of storage based on data reliability and a data holding period in accordance with the significance. The processing unit selects a storage medium from the plurality of storage media based on the stored information, and sets a manner of storage in the selected storage medium.

According to the present invention, the data reliability and the data holding period are determined in advance in accordance with data significance. An optimal storage medium among a plurality of storage media or an optimal manner of storage can be set based on the data reliability and the data holding period.

Further preferably, the data reliability is determined based on storage performance and storage redundancy for each type of the storage medium.

According to the present invention, the storage medium includes a variety of types such as a semiconductor memory (the semiconductor memory further including a variety of types) and a hard disk. Considering storage performance of these storage media and with which level of redundancy data is stored, data reliability can be determined. As a result of determination in such a manner, a data processing device adapted to the performance of the storage medium as well as to data reliability (that is, data significance) can be implemented.

Further preferably, the data holding period is determined based on a type of the storage medium.

According to the present invention, depending on a type of the semiconductor memory, some memories may no longer hold data due to cut-off of power supply. The data holding period is determined, considering a timing of cut-off of power supply specific to a vehicle. In this manner, a data processing device suited for the vehicle control system adapted to the type of the storage medium as well as to data reliability (that is, data significance) can be implemented.

Further preferably, the data holding period is determined based on a state of power supply to the storage medium.

According to the present invention, the data holding period can be determined, considering a timing of cut-off of power supply to the semiconductor memory that no longer holds data if power supply is cut off.

Further preferably, the operation unit is implemented by an ECU containing a plurality of types of storage media. The data processing device is implemented as one function of the ECU. The processing unit selects a storage medium within the ECU.

According to the present invention, the vehicle control system includes a large number of ECUs such as an engine ECU, an ECT (Electronically Controlled Automatic Transmission)_ECU. A CPU serving as an operation unit and a plurality of types of semiconductor memories are mounted on one ECU. The data processing device is implemented by the CPU as software, for example. The data processing device obtains data on data significance common among a plurality of applications from an application to be executed in the CPU, and stores the data in a storage medium most suitably adapted to the data in a most suitably adapted manner of storage. In this manner, a data processing device in a vehicle control system capable of appropriately storing data having different significance and readily accommodating modification of data significance or modification of reliability of the data storage medium can be provided.

Further preferably, the operation unit is implemented by an ECU containing a plurality of types of storage media. The vehicle control system includes a plurality of ECUs. The data processing device is implemented as one function of the ECU. The plurality of ECUs are connected so as to allow data communication with each other. The processing unit selects a storage medium in other ECU other than its own ECU.

According to the present invention, the data can be stored in a storage medium most suitably adapted to that data, inclusive of a storage medium (semiconductor memory) contained in another ECU, in a most suitably adapted manner of storage.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a timing chart of a variety of signals.

FIG. 5 shows a table for determining a type of a data storage manner.

FIG. 6 illustrates one example of specific data corresponding to the table in FIG. 5.

DESCRIPTION OF THE PREFERRED EMBODIMENTS

Figure 1:
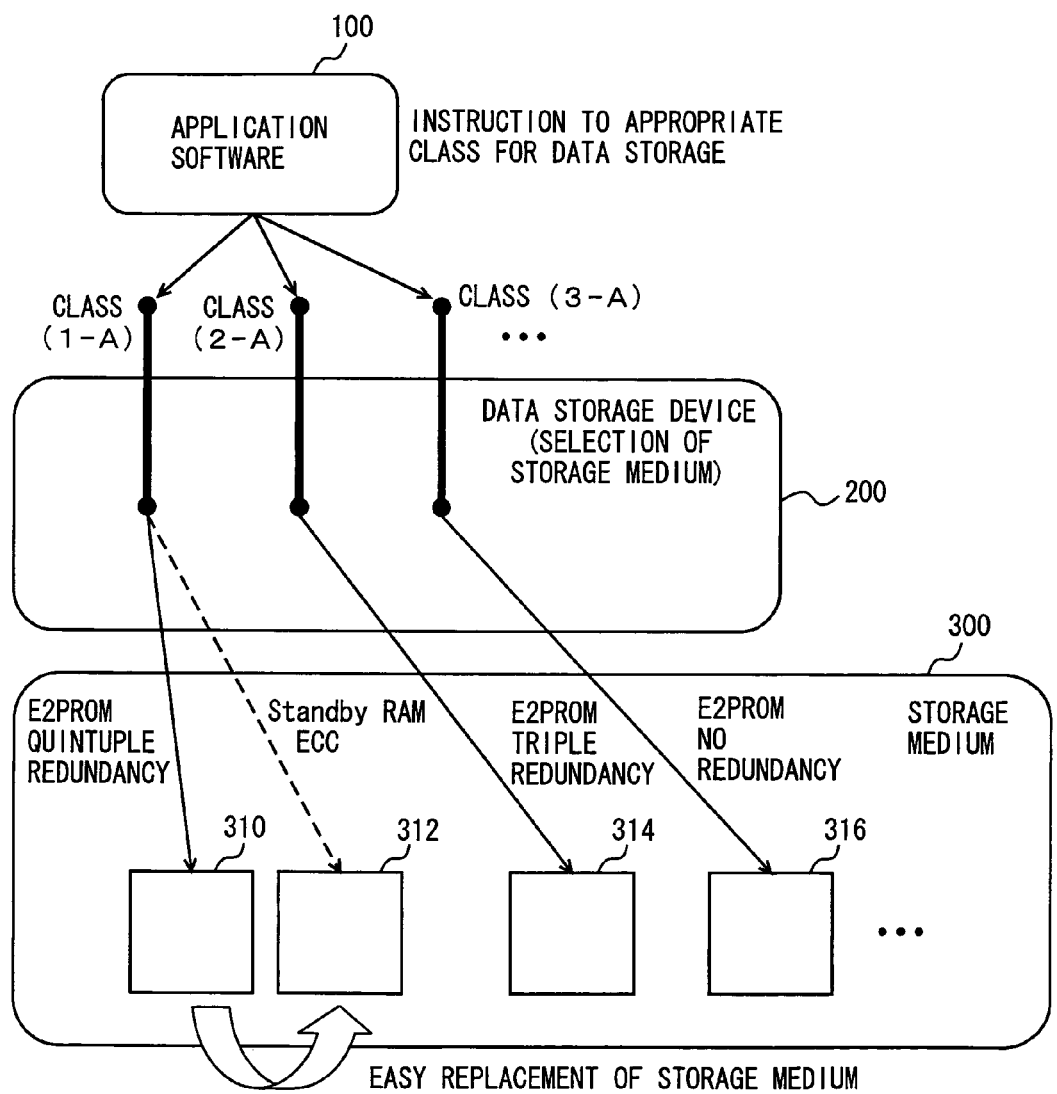
FIG. 1 is a schematic diagram showing a configuration of a vehicle control system according to an embodiment of the present invention.

An embodiment of the present invention will be described hereinafter with reference to the drawings. The same elements have the same reference characters allotted. Their label and function are also identical. Therefore, detailed description thereof will not be repeated.

FIG. 1 is a schematic diagram showing a configuration of a vehicle control system according to an embodiment of the present invention.

According to the schematic configuration shown in FIG. 1, a function of a control system incorporated in a vehicle is attained by application software 100. A plurality of pieces of application software 100 are executed by the ECU, and application software 100 outputs data to be stored, along with a class necessary for data storage, to a data storage device 200.

In data storage device 200, selection of a storage medium is carried out, based on a class obtained from application software 100 and a table for determining a type of a predetermined data storage manner.

Specifically, data storage device 200 is implemented by a program (software) executed by the ECU.

Examples of storage media 300 include an E2PROM, a Standby RAM, a hard disk, and the like. As shown in FIG. 1, an EPROM 310 having quintuple redundancy, a Standby RAM 312 attaining an ECC (Error Correction Code) function, an E2PROM 314 having triple redundancy, and an E2PROM 316 without redundancy are shown as examples of storage medium 300.

Figure 2:
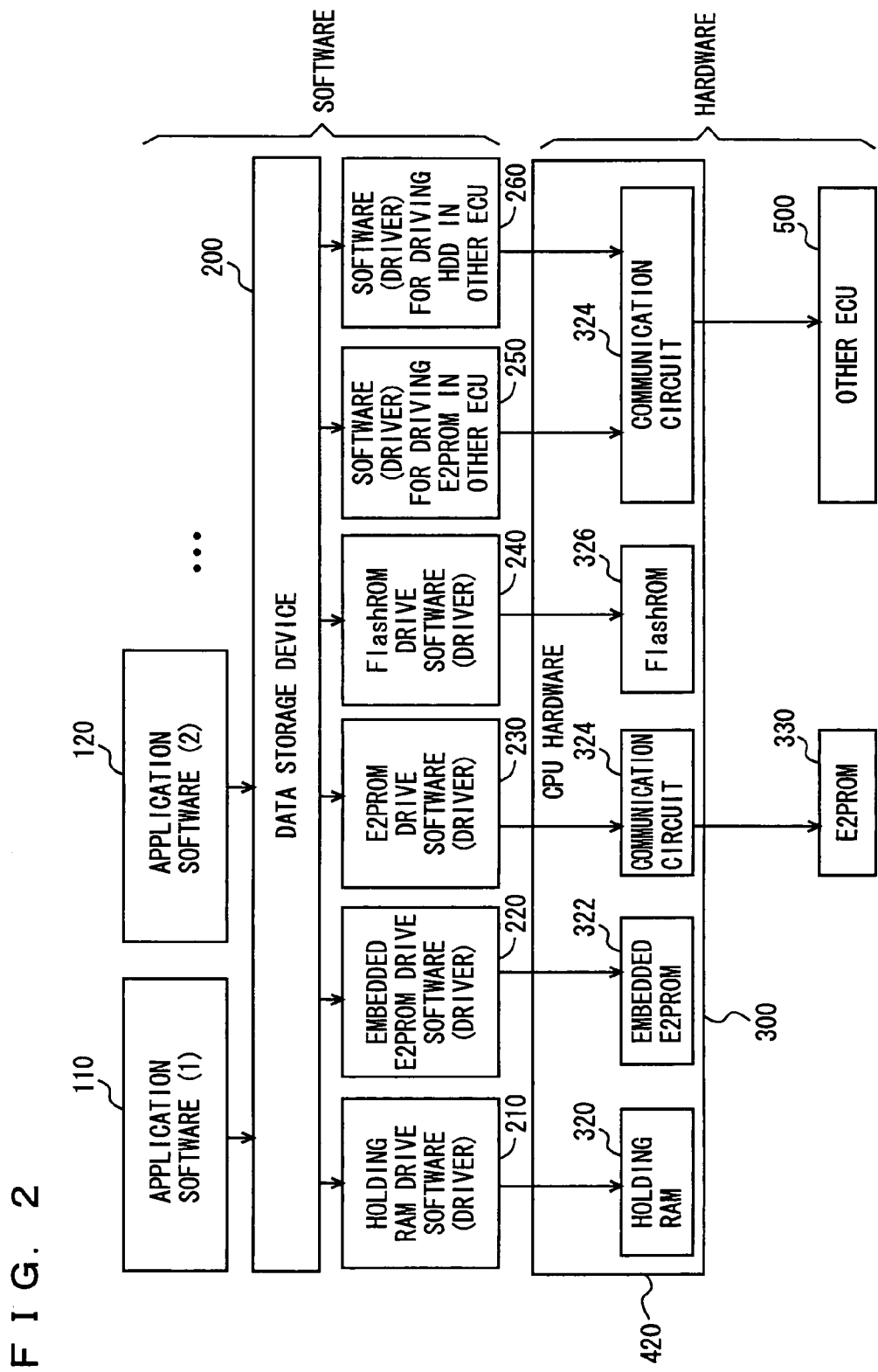
FIG. 2 shows a detailed configuration of the vehicle control system according to the embodiment of the present invention.

Referring to FIG. 2, a detailed configuration of the vehicle control system according to the embodiment of the present invention will be described.

As shown in FIG. 2 and as shown in FIG. 1 above, software such as application software (1) 110 and application software (2) 120, data storage device 200, and drivers corresponding to a variety of storage media are implemented as software.

Examples of the driver include holding RAM drive software 210, embedded E2PROM drive software 220, E2PROM drive software 230, Flash ROM drive software, software 250 for driving E2PROM in other ECU, software 260 for driving a hard disk in other ECU, and the like.

In addition, as shown in FIG. 2, a CPU 420 mounted on the ECU includes as hardware, a holding RAM 320, an embedded E2PROM 322, a communication circuit 324 for communicating data with other ECU 500 or with an E2PROM 330 mounted on other ECU other than its own ECU, and a Flash ROM 326.

Figure 3:
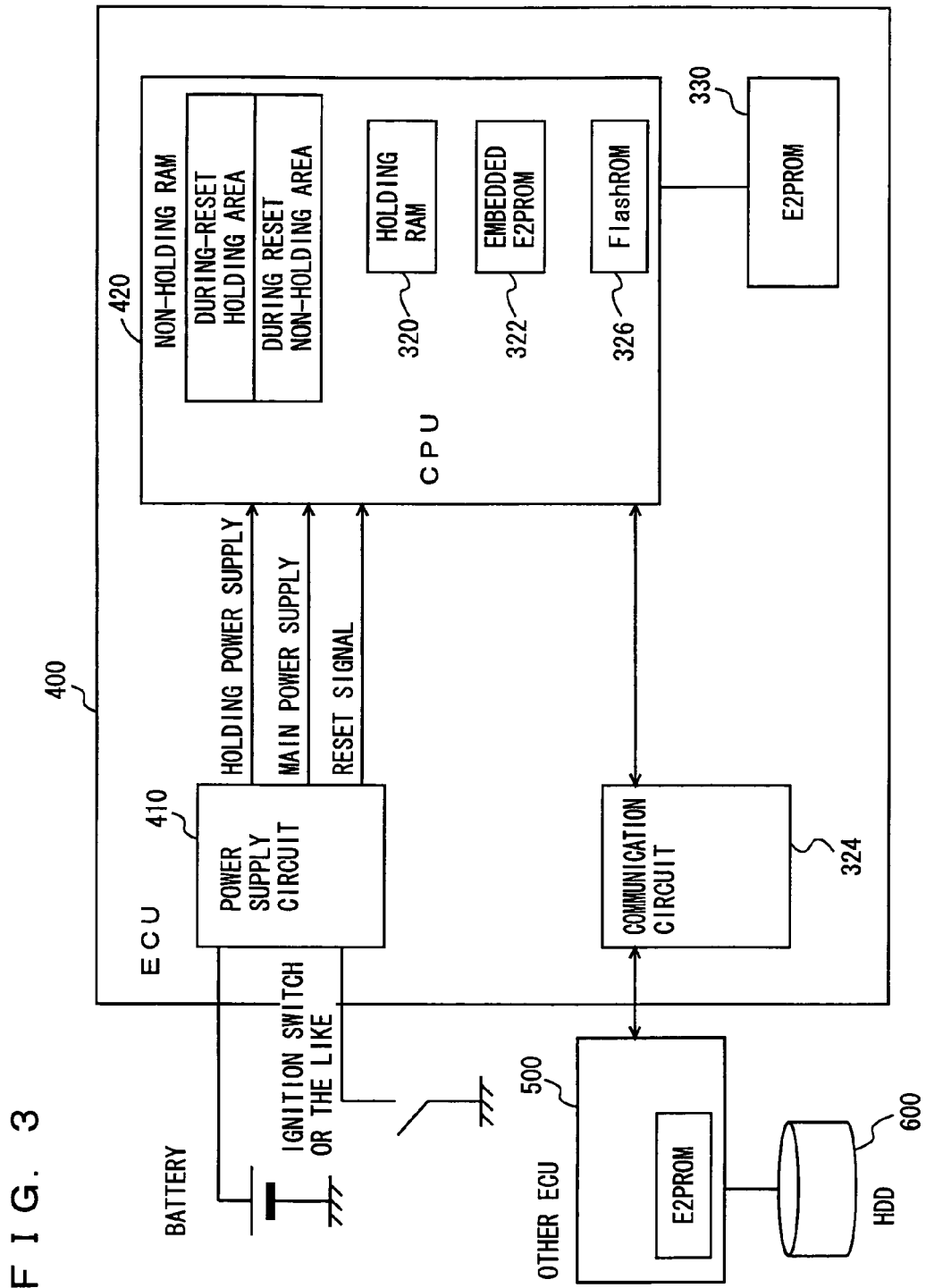
FIG. 3 is a control block diagram of an ECU.

FIG. 3 shows a control block diagram of the ECU. As shown in FIG. 3, an ECU 400 includes a power supply circuit 410, CPU 420, E2PROM 330 different from the embedded E2PROM in CPU 420, and communication circuit 324. In ECU 400, a battery is connected to power supply circuit 410 provided inside the ECU, and an ignition switch or the like is connected to power supply circuit 410.

The ignition switch urges ECU 400 to turn on the main power supply in order to initiate control. Depending on a configuration of ECU 400 or peripheral hardware, the main power supply of ECU 400 may be turned on using a signal other than the ignition switch. Power supply circuit 410 includes a circuit generating a voltage for driving CPU 420 or the like from a battery voltage in ECU 400. Power supply circuit 410 is also capable of controlling reset of CPU 420 using a reset signal.

As shown in FIG. 3, a holding power supply, a main power supply, and a reset signal are transmitted from power supply circuit 410 to CPU 420. The holding power supply represents a power supply voltage applied from outside of CPU 420 for holding data when the holding RAM is mounted on CPU 420. While the battery is connected, a holding voltage is constantly supplied to CPU 420. The main power supply is required for CPU 420 to perform an operation of the software. The main power supply is turned on, using an external signal such as the ignition switch as a trigger for initiating control. The reset signal is activated when the power supply is turned on and when CPU 420 is in an abnormal state (when power supply circuit 410 monitors an operation state of CPU 420 separately).

CPU 420 includes a non-holding RAM, holding RAM 320, embedded E2PROM 322, and Flash ROM 326. The non-holding RAM includes a during-reset holding area where data is held even during reset, and a during-reset non-holding area where data is not held during reset. The non-holding RAM is an RAM that cannot hold or compensate for the data when the main power supply is cut off even if a holding voltage is applied. The non-holding RAM includes the during-reset holding area where a value is held during reset, and the during-reset non-holding area where a value is not held or not compensated for.

Holding RAM 320 can hold data even when the main power supply is cut off so long as a holding power supply is applied. Embedded E2PROM 322 is a read-only memory which is erasable with ultra violet as well as programmable. Data once stored is held for ten years or more even if the power supply is cut off. Flash ROM 326 is a rewritable, non-volatile ROM.

Communication circuit 324 communicates with other ECU and transmits data to the ECU. A hard disk drive 600 is connected to ECU 400 through other ECU 500.

FIG. 4 is a timing chart showing change over time of the holding power supply, the main power supply, and the reset signal transmitted from power supply circuit 410 to CPU 420, such as the battery or the ignition switch described in connection with FIG. 3.

When the battery is connected and the system main relay is turned on, the holding power supply is turned on. When the battery is turned off, the holding power supply is also turned off. When the ignition switch or the like is turned on, the main power supply is turned on. Meanwhile, when the ignition switch or the like is turned off, the main power supply is turned off. The reset signal is activated when the power supply is turned on or when CPU 420 is in an abnormal state. A time period required for canceling reset is different, depending on the hardware of the storage medium.

Referring to FIG. 5, a table for determining a type of a data storage manner stored in CPU 420 will be described.

As shown in FIG. 5, the table has sixteen types of classes, for example, based on data reliability and the data holding period. The class is represented as class ($\alpha$-$\beta$).

According to data reliability class 1 ($\alpha$=1), destruction is not detected even if data is destructed. According to data reliability class 2 ($\alpha$=2), destruction is detected if data is destructed. According to data reliability class 3 ($\alpha$=3), if data is destructed, destruction is detected and data is repaired (single failure). According to data reliability class 4 ($\alpha$=4), if data is destructed, destruction is detected and data is repaired (double failure).

An example of data reliability class 1 is represented by a mount example in which data is not multiplexed. An example of data reliability class 2 is represented by a mount example in which simple data duplex (double redundancy), check sum, a parity bit, or an error detection code is employed. An example of data reliability class 3 is represented by a mount example of data triplex (triple redundancy), data quadruplex (quadruple redundancy), or a data correction code. An example of data reliability class 4 is represented by a mount example of data quintuplex (quintuple redundancy) or more, or a data correction code.

Here, data multiplexing is equivalent to memory redundancy. That is, data multiplexing represents a storage manner of detecting an error in data by storing a plurality of pieces of same data and comparing these pieces of data. Data duplex represents multiplexing by storing data in a duplex manner. Here, as there is a failure mode in which values for data read from a plurality of address areas may be identical depending on a failure mode of a storage device, one data is subjected to bit flipping as necessary, and thereafter the data is stored. Since comparison of two pieces of data is solely allowed, an error in data can be detected when there is a difference between two pieces of data. The error, however, cannot be corrected.

Data triplex represents multiplexing for triplication of data. Data can be corrected based on majority among three data values. If the power supply is cut off in the midst of rewriting of three pieces of data, it is assumed that the three pieces of data may be different from one another. In that case, correction may be impossible, depending on a method of use. Then, error detection is solely performed, and correction is not carried out. Data triplex is advantageous in that memory capacity may be small, as compared with data quadruplex or data quintuplex. Data quadruplex represents a data storage manner of multiplexing data in a quadruple manner. Error correction based on a majority rule can be performed. Specifically, even if the power supply is cut off in the midst of data rewriting, two pieces of data have an identical value without fail. Therefore, data correction based on a majority rule can be carried out.

The parity bit represents one type of data redundancy. The parity bit attains a function to detect an error by enabling a total of all bits of data as the parity bit. The error detection code (EDC) is one of data redundancy methods. An error can be detected, whereas a detectable range of destruction depends on a detection code length. The error correction code (ECC) is one of data redundancy methods, and an error can be corrected. A correctable range of destruction depends on a detection code length.

As to the check sum, a total of a plurality of pieces of data is held as check sum. An error is detected by operating the total of data as required and by comparing an operation result with a check sum value stored in advance.

In this manner, some can detect an error in the data, and some can not only detect an error in the data but also can correct the detected error. Data reliability is different depending on such functions.

A class of the data holding period will now be described.

A holding period class A ($\beta$=A) represents a class that data is stored even during a period in which reset is cancelled. The during-reset non-holding area of the non-holding RAM represents a mount example of holding period class A. The during-reset holding area of the non-holding RAM in which data is stored while the main power supply is turned on represents a mount example of a holding period class B ($\beta$=B). The holding RAM storing data while the holding power supply is turned on represents a mount example of a holding period class C ($\beta$=C). The embedded E2PROM, the E2PROM, the hard disk drive, and the like constantly storing data represent mount examples of a holding period class D ($\beta$=D).

As shown in FIG. 5, data reliability class ($\alpha$) includes "1" to "4", and class "4" has data reliability higher than class "1". Meanwhile, data holding period class ($\beta$) includes "A" to "D", and class "D" has a holding period longer than class "A". In other words, the longer holding period represents ability to hold data regardless of power supply from the power supply circuit.

FIG. 5 defines sixteen types of classes of class (1-A), class (1-B), class (1-C), class (1-D), class (2-A), . . . , class (4-D), each of which represents a combination of the data reliability ($\alpha$=1, 2, 3, 4) and the holding period ($\beta$=A, B, C, D). The classes are used as labels common among a plurality of applications.

FIG. 6 illustrates one example of specific data corresponding to the table in FIG. 5.

As to class (1-A), class (1-B), and the like, even when data is erroneous, the data is frequently rewritten, that is, the data is less likely to affect control itself. General control data represents an example of such data. As to class (1-C), in spite of an error caused in the data, the error can be corrected through control, although it is convenient to hold the data. Data representing a value for correction of change over time of a control target represents an example of such data.

Class (1-D) represents information less frequently rewritten and data not critical. An example of such data is auxiliary management data.

Class (3-C) represents data such as a diagcode, i.e., data at the time of a past operation which is desirably to be retained in a reliable manner, considering service. Class (3-D) represents information less frequently rewritten and data relatively critical. An example of such data is a property correction value.

Class (4-D) represents information less frequently rewritten and critical data. Examples of such data are security information, and a control setting value related to safety and regulation.

Figure 7:
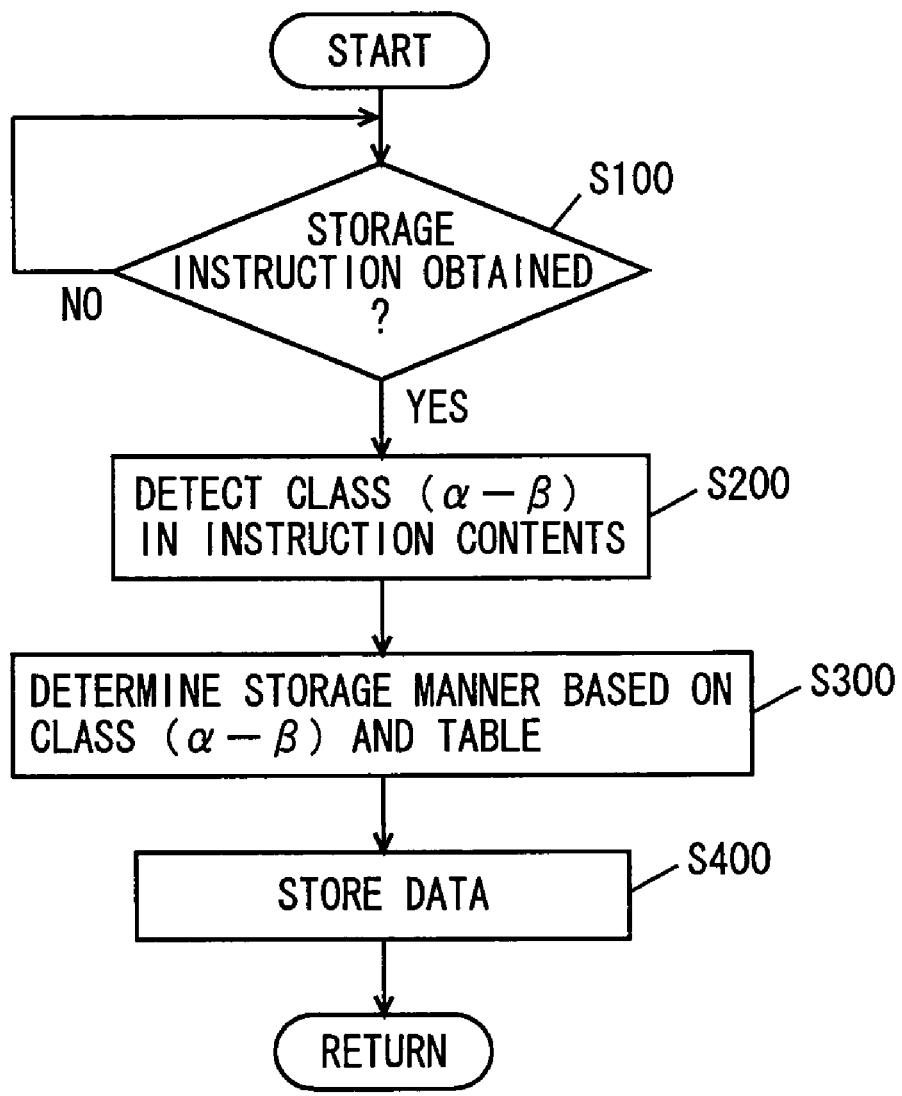
FIG. 7 is a flowchart illustrating a control configuration of a program executed in a data storage device.

Referring to FIG. 7, a control configuration of a program executed in data storage device 200 in FIG. 1 will now be described.

At step (hereinafter, step is abbreviated as "S") 100, data storage device 200 determines whether or not a storage instruction from application software 100 has been obtained. Here, class (α-β) and data to be stored are output from application software 100 to data storage device 200. When the storage instruction is obtained (YES at S100), the process proceeds to S200. Otherwise (NO at S100), the process returns to S100.

At S200, data storage device 200 senses class (α-β) in instruction contents. Here, class (α-β) corresponds to the table for determining a type of a data storage manner shown in FIG. 5.

At S300, data storage device 200 determines a data storage manner, based on class (α-β) and the table shown in FIG. 5. In this manner, data reliability and the holding period are determined in accordance with data significance.

At S400, data storage device 200 stores data received from application software 100 in an appropriate storage medium with appropriate data reliability, based on the storage manner determined at S300.

An operation of data storage device 200 of the vehicle control system according to the present embodiment based on the above-described configuration and flowcharts will now be described.

In a large number of pieces of application software 100 executed in CPU 420 of ECU 400, data significance is indicated as labels, based on the classes common among the application software. When the data calculated by application software 100 should be stored, a class thereof is defined by application software 100. Accordingly, a class representing the data significance common among a plurality of pieces of application software 100 is generated.

When the data to be stored is generated by application software 100, a storage instruction is output to data storage device 200 (YES at S100). In data storage device 200, an optimal storage manner is determined based on class (α-β), that is, based on data reliability and the holding period determined as the classes of the data, (S200. S300). Then, the data is stored with a prescribed reliability in a storage medium determined based on the plurality of mount examples provided with respect to the predetermined data reliability and on the plurality of mount examples provided with respect to the holding period.

As described above, according to the data storage device in the vehicle control system of the present embodiment, the data can be stored in an optimal storage medium with optimal data redundancy in order to attain optimal data reliability and holding period, based on the class serving as a common label received from a plurality of pieces of application software.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing device storing data in at least one of a plurality of applications to be executed in an operation unit in at least one of a plurality of storage media in a vehicle control system including the operation unit and the plurality of storage media, the data processing device comprising:
    an obtaining unit that obtains information on significance of vehicle control data processed in the operation unit from the at least one of the plurality of applications; and
    a processing unit that determines a class of data reliability, a data holding period based on the information on significance of vehicle control data, and that selects a storage medium from among the plurality of storage media in the vehicle control system in accordance with the determined class of data reliability and data holding period, and that sets a manner of storage in the selected storage medium,
    wherein the processing unit selects the storage medium from among the plurality of storage media by:
        selecting at least one first storage medium from among the plurality of storage media to store data that is rewritten at a first interval, the at least one first storage medium being adapted to a first data holding period,
        selecting at least one second storage medium from among the plurality of storage media to store data that is rewritten at a second interval, the second interval being longer than the first interval, the at least one second storage medium being adapted to a second data holding period, the second data holding period being longer than the first data holding period,
    the data is stored in the selected at least one first storage medium and the selected at least one second storage medium such that data of a reliability below a predetermined threshold, which is less frequently rewritten, is stored in the selected at least one second storage medium and not in the selected at least one first storage medium, and
    the information on the class of significance of vehicle control data is common among the plurality of applications.

2. The data processing device according to claim 1, wherein said class of data reliability is determined based on storage performance and storage redundancy for each type of said storage medium.

3. The data processing device according to claim 1, wherein said data holding period is determined based on a type of said storage medium.

4. The data processing device according to claim 1, wherein said data holding period is determined based on a state of power supply to said storage medium.

5. The data processing device according to claim 1, wherein
    said operation unit is implemented by an electronic control unit containing a plurality of types of storage media,
    said data processing device is implemented as one function of said electronic control unit,
    said processing unit selects a storage medium within said electronic control unit, and
    said electronic control unit is in said vehicle control system.

6. The data processing device according to claim 1, wherein
    said operation unit is implemented by an electronic control unit containing a plurality of types of storage media,
    said vehicle control system includes a plurality of electronic control units,
    said data processing device is implemented as one function of said electronic control unit,
    said plurality of electronic control units are connected so as to allow data communication with each other, and
    said processing unit selects a storage medium in electronic control unit other than its own electronic control unit.

7. A data processing device storing data in at least one of a plurality of applications to be executed in an operation unit in at least one of a plurality of storage media in a vehicle control system including the operation unit and the plurality of storage media, the data processing device comprising:
    obtaining means that obtains information on significance of vehicle control data processed in the operation unit from the at least one of the plurality of applications; and processing means that determines a class of data reliability, a data holding period based on the information on significance of vehicle control data, and selects a storage medium from among the plurality of storage media in accordance with the determined class of data reliability and data holding period, and that sets a manner of storage in the selected storage medium, wherein the processing means selects the storage medium from among the plurality of storage media by:

selecting at least one first storage medium from among the plurality of storage media to store data that is rewritten at a first interval, the at least one first storage medium being adapted to a first data holding period, selecting at least one second storage medium from among the plurality of storage media to store data that is rewritten at a second interval, the second interval being longer than the first interval, the at least one second storage medium being adapted to a second data holding period, the second data holding period being longer than the first data holding period, the data is stored in the selected at least one first storage medium and the selected at least one second storage medium such that data of a reliability below a predetermined threshold, which is less frequently rewritten, is stored in the selected at least one second storage medium and not in the selected at least one first storage medium, and the information on the class of significance of vehicle control data is common among the plurality of applications.

8. The data processing device according to claim 7, wherein said class of data reliability is determined based on storage performance and storage redundancy for each type of said storage medium.

9. The data processing device according to claim 7, wherein said data holding period is determined based on a type of said storage medium.

10. The data processing device according to claim 7, wherein said data holding period is determined based on a state of power supply to said storage medium.

11. The data processing device according to claim 7, wherein said operation unit is implemented by an electronic control unit containing a plurality of types of storage media, said data processing device is implemented as one function of said electronic control unit, said processing means includes means for selecting a storage medium within said electronic control unit, and said electronic control unit is in said vehicle control system.

12. The data processing device according to claim 7, wherein said operation unit is implemented by an electronic control unit containing a plurality of types of storage media, said vehicle control system includes a plurality of electronic control units, said data processing device is implemented as one function of said electronic control unit, said plurality of electronic control units are connected so as to allow data communication with each other, and said processing means includes means for selecting a storage medium in electronic control unit other than its own electronic control unit.

\* \* \* \* \*